No. 728,490. PATENTED MAY 19, 1903.
R. MULHOLLAND.
RUBBER TIRED WHEEL.
APPLICATION FILED AUG. 11, 1902.
NO MODEL. 2 SHEETS—SHEET 2.

Witnesses.
L. M. Sangster
Geo. A. Neubauer

Inventor.
Richard Mulholland
By ......... Attorney.

No. 728,490. Patented May 19, 1903.

UNITED STATES PATENT OFFICE.

RICHARD MULHOLLAND, OF DUNKIRK, NEW YORK.

RUBBER-TIRED WHEEL.

SPECIFICATION forming part of Letters Patent No. 728,490, dated May 19, 1903.

Application filed August 11, 1902. Serial No. 119,206. (No model.)

*To all whom it may concern:*

Be it known that I, RICHARD MULHOLLAND, a citizen of the United States, residing at Dunkirk, in the county of Chautauqua and State of New York, have invented certain new and useful Improvements in Rubber-Tired Wheels, of which the following is a specification.

This invention has reference to an improved means for securing a tire of rubber or other yielding or elastic material to the rim of a vehicle or similar wheel so as to prevent creeping or longitudinal movement of the tire in the rim which is independent of and supplemental to wires, bands, or other devices that pass through the tire to retain said tire in position on the rim, and which consists in fitting a bolt or bolts or a similar device through the rim, with its outer end projecting and embedding in the under surface of the tire and in proximity to the wires, bands, or other devices.

The object of the invention is not only to prevent creeping by devices, such as bolts, supplemental to the main retaining devices, such as wires, but also to arrange the said supplemental devices and main retaining devices in proximity, so that they will mutually aid and strengthen each other, but not in actual contact, so that the wires may have a very slight lateral movement under the action of the tire.

The invention also has reference to certain details of construction, all of which will be fully and clearly hereinafter described and claimed, reference being had to the accompanying drawings, in which—

Figure 1:
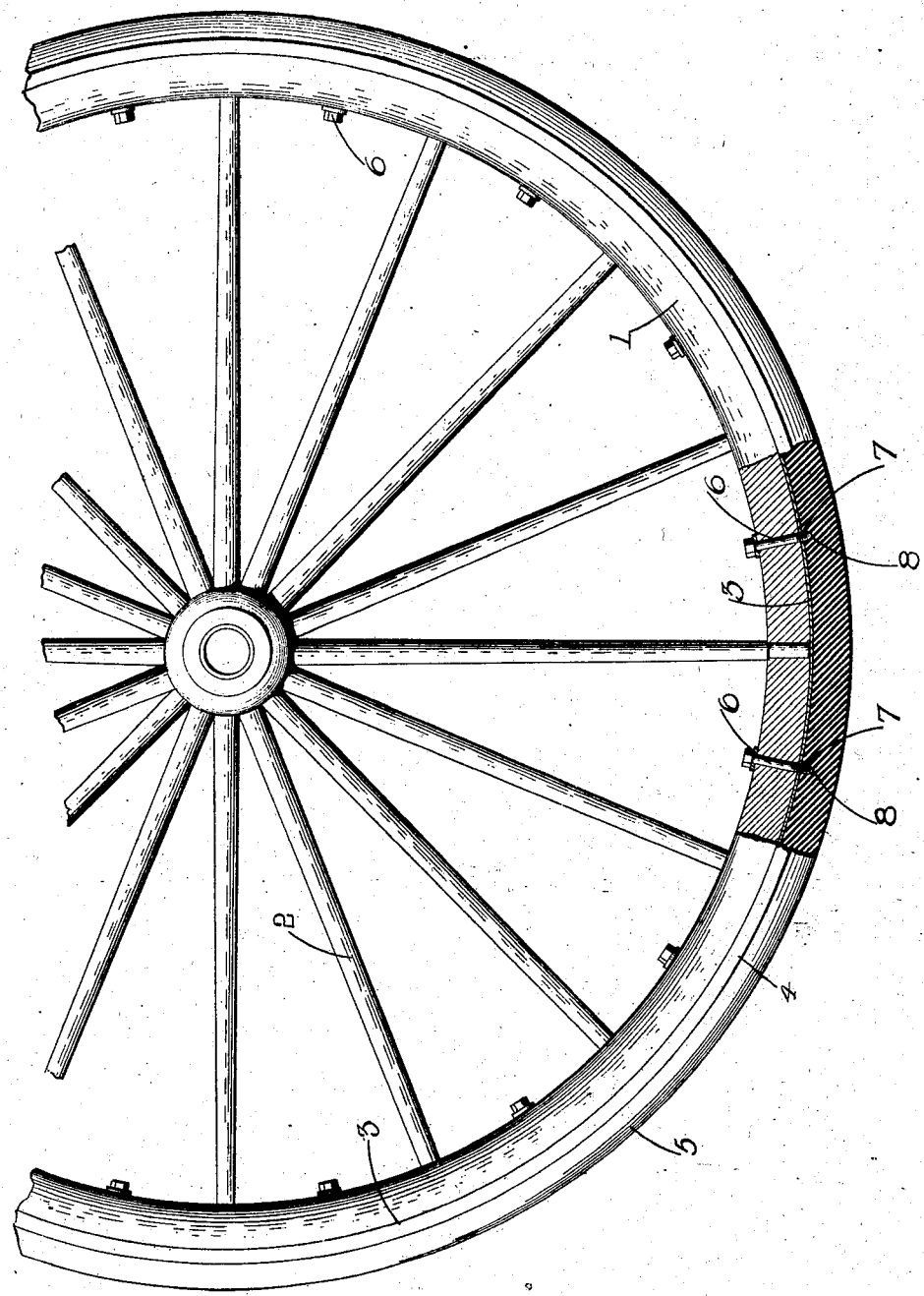
Figure 2:
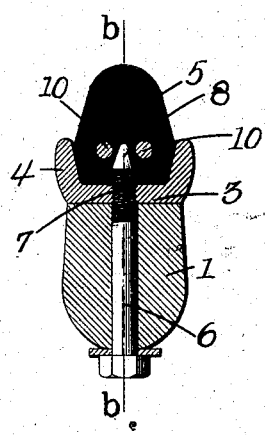
Figure 3:
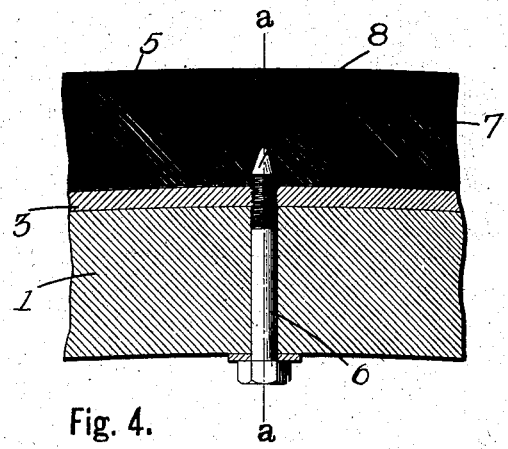
Figure 4:
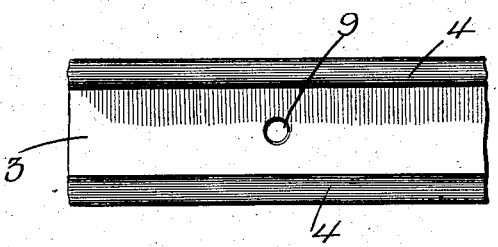
Figure 5:
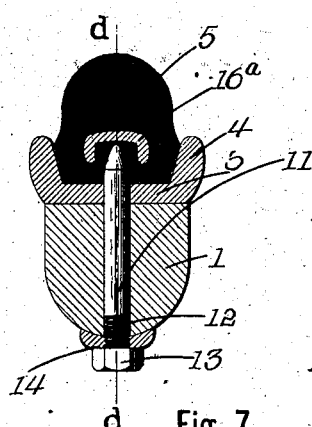
Figure 6:
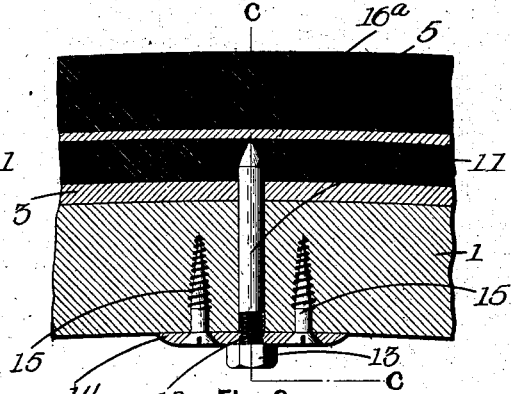
Figure 7:
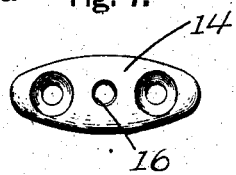
Figure 8:

Figure 1 is a fragment of a wheel, partially in section, to show one form of my improved means for preventing creeping. Fig. 2 is a transverse section on line *a a*, Fig. 3. Fig. 3 is a fragmentary section on line *b b*, Fig. 2. Fig. 4 is a top plan view of a fragment of the rim with the bolt removed. Fig. 5 is a transverse section on line *c c*, Fig. 6, through another form of my improvement. Fig. 6 is a fragmentary longitudinal section on line *d d*, Fig. 5. Fig. 7 is a detached view of the holding-plate. Fig. 8 is a transverse section through a form similar to Fig. 2, with the exception that the felly is omitted and the rim is made thicker.

In referring to the drawings in detail like numerals designate like parts.

1 represents the felly of the wheel, 2 the spokes, and 3 the annular rim, which is superimposed upon the felly. The preferable form of rim 3 which I employ is of metal and has outwardly-projecting side flanges 4, being what I term a "metal-channeled" rim. This rim is annular and is fitted firmly around the felly, and the tire 5, which is preferably of cushion form, is longitudinally compressed in the channel of the rim, with its ends abutting, and is retained in the channel by the usual wires, bands, or similar devices.

In one form of my present invention (shown in Figs. 1 to 4, inclusive, of the drawings) I place at intervals around the circumference of the wheel a series of radially-extending bolts 6, which pass through the felly and rim of the wheel and project into the under surface of the tire. These bolts are preferably arranged between the spokes, and they are provided with outer screw-threaded extremities 7, which terminate in cone ends 8, and the bolts are of sufficient length to permit the screw-threaded parts 7 to engage in screw-threaded openings 9 in the rim and the ends 8 to project and embed themselves in the under surface of the tire. In this form of the invention two parallel annular retaining-wires 10 are employed, which pass through longitudinal openings in the interior of the tire, and the projecting ends 8 of the bolts embed themselves in the tire at points approximately centrally between and below these wires, but not in actual contact with said wires. If desired, the bolt ends 8 and the walls of the openings in which they are embedded may be coated with cement, which when dry will unite the tire and bolt ends firmly together.

In the other form of the invention (shown in Figs. 5 to 7, inclusive) a bolt 11, which is screw-threaded at 12 near its head 13, is passed through the felly and rim and projects into the under surface of the tire. These bolts 11, which have a smooth outer surface, with the exception of the screw-threaded part 12, are held in place by plates 14, which are attached to the inner surface of the felly by screws, rivets, or similar devices 15, the plates being provided with screw-threaded openings 16, in which the parts 12 engage. In this form a channeled retaining-band 16ª, similar to that shown in my Patent No. 696,688, is employed, which passes through an interior longitudinal opening in the tire, and the outer projecting ends of the bolts extend nearly up to the under surface of the central portion of the band and between the downwardly-extending side flanges of the band. The bolts not only prevent creeping or longitudinal movement of the tire, but also, owing to the fact that they project in proximity to the wires or bands, prevent lateral movement of said wires or bands sufficient to permit the tire to leave the rim without interfering with the infinitesimal movement of the wires during the operation of the wheel. On the other hand, the wires or bands also hold that portion of the tire adjacent to and partially surrounding the bolts in a firmly-compressed condition around the bolt ends, owing to the tension of the wires or bands and the longitudinal compression of the tire, and thus tend to hold the bolt ends in their seats in the tire under extra tension, thereby materially strengthening and stiffening that portion of the tire into which the bolts project.

The ends of the retaining bands, wires, or similar devices may be united in any of the well-known ways, such as brazing or welding, or in the manner shown in my Patent No. 696,688.

In the form shown in Fig. 8 the felly is dispensed with and an annular metal rim 17, thicker and stronger than the rim shown in the other constructions, takes the place of both felly and rim. This form can be employed for especially light wheels.

Various devices extending interiorly through the tire can be employed to retain the tire on the rim, and I therefore do not intend to limit myself to any specific form of interior retaining devices, as my present invention simply consists in passing a bolt or a series of bolts or similar devices through the felly and rim and embedding them in a tire with their ends in proximity to the interior retaining devices.

The bolts are preferably arranged at intervals around the wheel and between the spokes and not only serve to prevent longitudinal movement of the tire in the rim, but also securely fasten the rim to the felly.

This invention is applicable to all forms of tires now in use which are held in position on the rim by a retaining device and is to be used as a supplemental fastening to secure the tire against creeping or longitudinal movement.

I claim as my invention—

1. In a device of the class described, a rim, a tire superimposed on the rim, devices such as one or more wires extending longitudinally through the interior of the tire for retaining the tire on the rim and one or more bolts extending through the rim and projecting into the under surface of the tire and in proximity to but not in actual contact with said wire or wires, substantially as set forth.

2. In a device of the class described, a felly, a rim superimposed on the felly, a tire superimposed on the rim, a plurality of parallel horizontally-extending wires passing through the interior of the tire for retaining the tire on the rim, and one or more bolts passing through the rim and extending up into the tire with its end or ends centrally between the wires, substantially as set forth.

3. In a vehicle-wheel, a rim having screw-threaded openings, a solid-rubber tire longitudinally compressed on said rim, longitudinally-extending wires or the like for securing said tire to the rim and a screw-bolt extending through the screw-threaded openings in the rim and projecting into the under side of the tire in proximity to but not in actual contact with the wires or the like, substantially as set forth.

RICHARD MULHOLLAND.

Witnesses:
A. J. SANGSTER,
L. M. SANGSTER.